(12) United States Patent
Thomson et al.

(10) Patent No.: US 7,937,162 B2
(45) Date of Patent: May 3, 2011

(54) MACHINE OPERATOR INTERFACE HAVING LINKED HELP FEATURE

(75) Inventors: Norval P. Thomson, Dunlap, IL (US); Mark C. Redden, Washington, IL (US); Timothy J. Silvers, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 706 days.

(21) Appl. No.: 11/589,958

(22) Filed: Oct. 31, 2006

(65) Prior Publication Data

US 2008/0188954 A1 Aug. 7, 2008

(51) Int. Cl.
*G05B 11/01* (2006.01)
*G06F 7/70* (2006.01)
*G06F 3/00* (2006.01)

(52) U.S. Cl. ............ 700/17; 700/83; 701/50; 702/29; 702/112; 715/705; 340/425.5

(58) Field of Classification Search .......... 700/17, 700/83, 264; 701/50, 211, 29, 30, 70, 76, 701/107, 110, 112, 116; 715/703, 705, 716; 702/184; 340/425.5, 426.15, 426.22, 426.3, 340/426.32, 438, 459, 460, 461, 463, 500, 340/516, 679, 686.1; 280/5.501

See application file for complete search history.

(56) References Cited

U.S. PATENT DOCUMENTS

| | | |
|---|---|---|
| 5,212,692 A | 5/1993 | Itoh |
| 5,305,206 A | 4/1994 | Inoue et al. |
| 5,345,389 A | 9/1994 | Calvin et al. |
| 5,854,988 A | 12/1998 | Davidson et al. |
| 6,061,617 A | 5/2000 | Berger et al. |
| 6,343,237 B1 | 1/2002 | Rossow et al. |
| 6,587,039 B1 | 7/2003 | Woestemeyer et al. |
| 6,717,589 B1 | 4/2004 | Grillo et al. |
| 7,039,867 B1* | 5/2006 | Scheidig .................... 715/703 |
| 2003/0093166 A1* | 5/2003 | Erko et al. ................... 700/90 |
| 2004/0139084 A1 | 7/2004 | Markow |
| 2005/0154985 A1 | 7/2005 | Burkhart et al. |
| 2005/0192732 A1 | 9/2005 | Narisawa et al. |
| 2006/0092033 A1 | 5/2006 | Hoff et al. |
| 2007/0049439 A1* | 3/2007 | Garnett ............................ 475/5 |
| 2007/0120697 A1* | 5/2007 | Ayoub et al. ............. 340/686.1 |
| 2008/0300828 A1* | 12/2008 | Kojima ........................ 702/184 |

FOREIGN PATENT DOCUMENTS

| | | |
|---|---|---|
| EP | 0122043 | 10/1984 |
| EP | 0371284 | 6/1990 |
| WO | WO 00/75736 | 12/2000 |

\* cited by examiner

*Primary Examiner* — Kidest Bahta
*Assistant Examiner* — Sheela Rao
(74) *Attorney, Agent, or Firm* — Finnegan, Henderson, Farabow, Garrett & Dunner LLP

(57) ABSTRACT

An operator interface for a machine is disclosed. The operator interface may have an operator interface device for receiving operator input corresponding to a requested machine function, wherein a machine function signal is generated in response to the received operator input. The operator interface may also have a help request device configured to receive an operator's request for information and generate a help signal. The operator interface may further have a controller in communication with the operator interface device and the help request device. The controller may be configured to provide information to the operator in response to receiving the help signal and the machine function signal. The information may relate to the requested machine function.

19 Claims, 3 Drawing Sheets

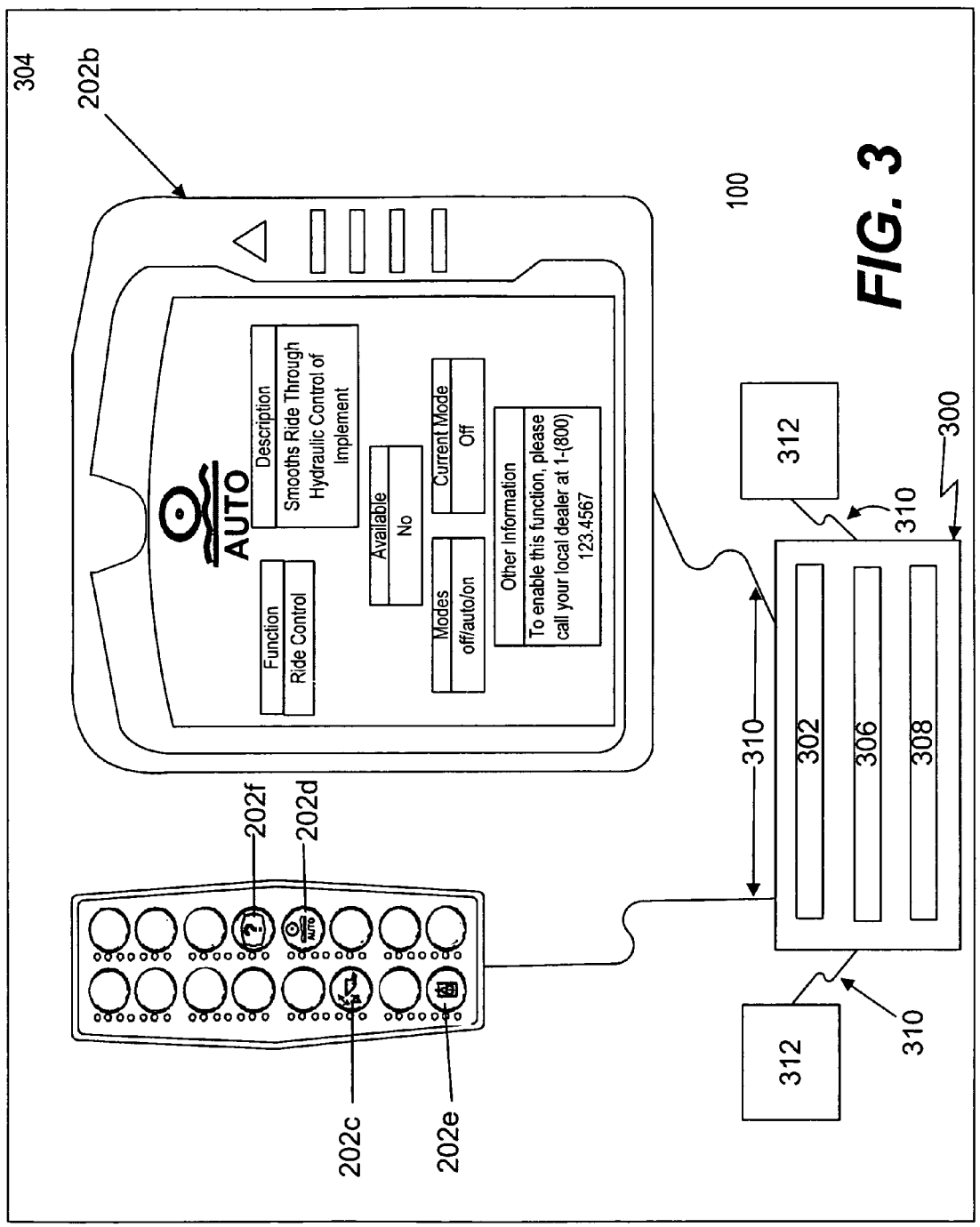

MACHINE OPERATOR INTERFACE HAVING LINKED HELP FEATURE

TECHNICAL FIELD

The present disclosure is directed to a machine operator interface and, more particularly, to a machine operator interface having a linked help feature.

BACKGROUND

Machines such as, for example, wheel loaders, motor graders, agricultural tractors, and other types of heavy equipment have a variety of tools attached to and controlled by the machine's operator. These tools can be relatively complicated and difficult to operate. Each tool may have a different operator interface with numerous controls for position, orientation, and other associated features and functions.

When an operator is new to a machine, the process of learning and mastering the function of each of the controls may be time consuming and frustrating. Often, training for the new operator involves nothing more than trial and error, or significant amounts of time spent with an operating manual. Trial and error, however, can be inefficient, increase operator mental workload, and add to frustration during machine operation. Utilizing the manual, although effective in some situations, may provide little help if the manual is written in a language foreign to the operator.

One alternative method of acquainting a new operator with a machine is described in U.S. Pat. No. 5,345,389 (the '389 patent) issued to Calvin et al., on Sep. 6, 1994. Specifically, the '389 publication describes a control system for a glass forming machine. The control system includes a touch screen monitor having menu driven software, which permits configuration of the glass forming machine. A help button is provided with each screen displayed on the monitor. Pushing this help button can produce a display in which a text balloon is drawn that includes information concerning the function of a particular button on that same screen. For example, when a console operator pushes the help button and then another button on the same displayed screen such as a "Graphic Display" button, a corresponding text balloon is displayed on the screen. The text balloon points to the graphics display button and informs the user of the function of this particular button.

Although the help button feature of the '389 patent may provide some of the training necessary to acquaint a new operator with the functions of a machine, it may be inadequate and problematic. In particular, the help button feature does not provide any information about available operating modes of the machine or the current operating mode of the machine. In addition, the help button feature is only useful in learning about other buttons on the same display screen and provides no information about operator interface devices of the machine that are not part of the same display screen. Further, the '389 patent does not describe any way of controlling operation of the help button feature during an operating process of the machine. In other words, if, during a particular operation of the machine, an operator desires to learn about a function of the machine and depresses the help button followed by the function button on the display, the operator may unintentionally activate the function, when only information was desired.

The operator interface of the present disclosure solves one or more of the problems set forth above.

SUMMARY OF THE INVENTION

One aspect of the present disclosure is directed to an operator interface for a machine. The operator interface may include an operator interface device for receiving operator input corresponding to a requested machine function, wherein a machine function signal is generated in response to the received operator input. The operator interface may also include a help request device configured to receive an operator's request for information and generate a help signal. The operator interface may further include a controller in communication with the operator interface device and the help request device. The controller may be configured to provide information to the operator in response to receiving the help signal and the machine function signal. The information may relate to the requested machine function.

Another aspect of the present disclosure is directed to a method of providing information relating to operation of a machine. The method may include receiving a request for information and receiving a request for actuation of a machine function. The method may also include providing information to an operator of the machine in response to receiving the request for information and the request for actuation. The information may relate to the machine function.

BRIEF DESCRIPTION OF THE DRAWINGS

FIG. 3 is a pictorial illustration of an exemplary disclosed system for use with the operator station of FIG. 2.

DETAILED DESCRIPTION

Figure 1:
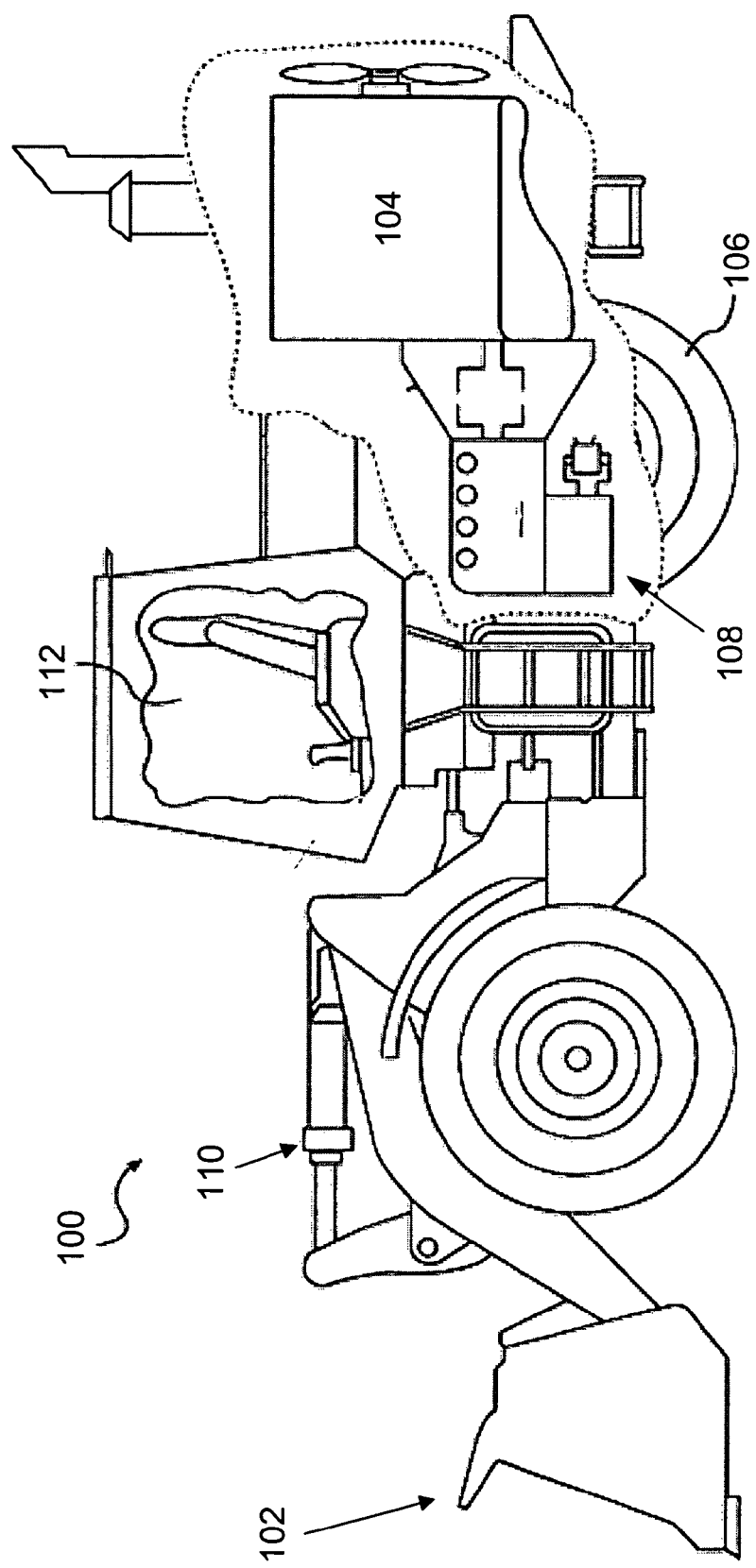
FIG. 1 is a diagrammatic illustration of an exemplary disclosed machine.

FIG. 1 illustrates an exemplary machine 100 having multiple systems and components that cooperate to accomplish a task. The tasks performed by machine 100 may be associated with a particular industry such as mining, construction, farming, transportation, power generation, or any other industry known in the art. For example, machine 100 may embody a mobile machine such as the wheel loader depicted in FIG. 1, a bus, a tractor, a backhoe, a bulldozer, a crane, an on- or off-highway haul truck, or any other type of mobile machine known in the art. Machine 100 may include one or more implements 102 for facilitating specific work-related tasks. Machine 100 may include a power source 104 operatively coupled to drive at least one traction device 106 by way of a power train 108. Power source 104 may also provide power to one or more actuators 110 for moving one or more implements 102. Machine 100 may further include a station 112 for operator control of power train 108 and/or implements 102.

Implements 102 may include any tool used in the performance of a work-related task. For example, implements 102 may include one or more of a blade, a bucket, a shovel, a ripper, a dump bed, a fork arrangement, a broom, a sweeper, a grasping device, a cutting tool, a digging tool, a propelling tool, or any other task-performing tool known in the art. Implements 102 may be stationed in any preferred manner with respect to operator station 112, and configured to rotate, slide, swing, pivot, spin, lift, or move in any other manner known in the art. At least one actuator 110 may function to move work implement 102 in at least one of these manners. Actuator 110 may include, for example, a hydraulic or pneumatic cylinder, a pump, a motor, or any other type of actuator known in the art.

Figure 2:
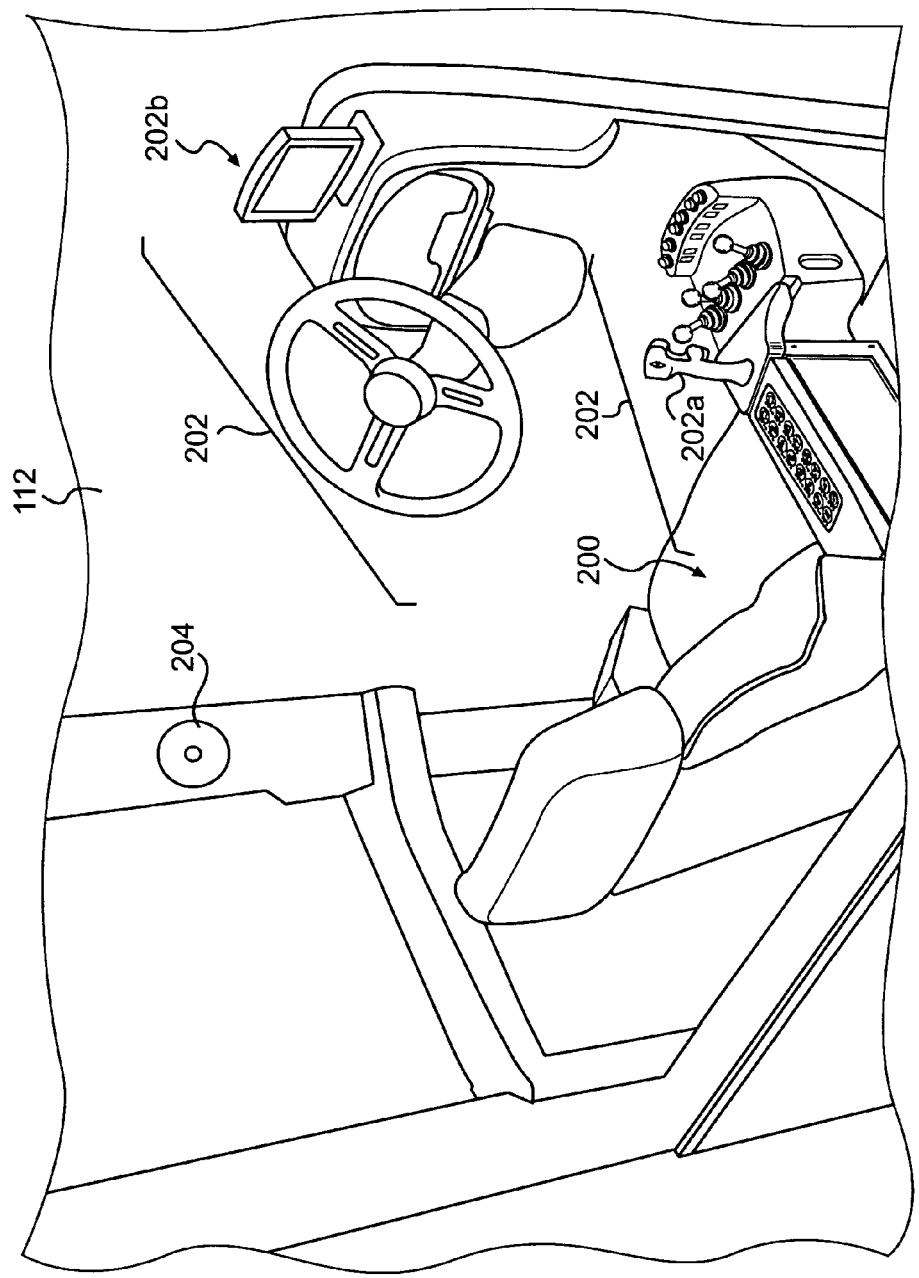
FIG. 2 is a pictorial illustration of an exemplary disclosed operator station for use with the machine of FIG. 1.

As illustrated in FIG. 2, operator station 112 may include, proximate an operator seat 200, operator interface devices 202 for receiving operator input to control machine movement and/or functionality. Operator interface devices 202 may receive a request for actuation of a machine function, and in response, produce signals corresponding to the requested machine function. For example, an operator may tilt a joystick 202a forward, indicating a request for downward movement of implement 102. In response to the operator's request, an actuation signal corresponding to the downward movement may be generated. Operator interface devices 202 may include any number of buttons, control levers, switches, joysticks, pedals, membrane keys, touch keys, soft keys, wheels, knobs, a mouse, keypads, control panels, keyboards, touch screens, or any other such interface devices known in the art. Operator station may also include one or more audio transducers 204, such as, a speaker or the like.

Additionally, operator interface devices 202 may include a display 202b stationed proximate the operator seat 200 to reflect the status and/or performance of the machine 100 or systems or components thereof to the operator. Display 202b may be one of a liquid crystal display, a CRT, a PDA, a plasma display, a touch-screen, a monitor, a portable hand-held device, or any other display known in the art.

FIG. 3 shows an exemplary embodiment of operator interface devices 202. In this example, operator interface devices 202 may include a plurality of input devices (202a-f) for receiving operator input corresponding to a respective requested machine function, and for generating a respective actuation signal. The actuation signal may, in turn, cause actuation of the requested machine function. For example, one input device 202c may correspond to an implement control function. A second input device 202d may correspond to a ride control function. A third input device 202e may correspond to a hydraulic system control function. It is to be appreciated that additional receiving devices may be assigned to other machine functions, such as lighting system control functions, fuel system control functions, transmission system control functions, steering control functions, engine control functions, traction system control functions, power source control functions, interior system control functions, or any other machine functions known in the art.

Additionally, operator interface devices 202 may include at least one help request device 202f to receive an operator's request for information, and to generate a corresponding help signal. In other words, activation of help request device 202f may indicate that the operator requires information pertaining to operation of machine 100. Help request device 202f may be illuminated or be backlit upon activation thereof.

As shown in FIG. 3, a controller 300 may communicate with operator interface devices 202 to provide requested information to the operator upon receiving both the help signal and the requested actuation signal. Controller 300 may provide the requested information to the operator via display 202b. However, it is to be appreciated that the requested information may also be audibly presented to the operator via audio transducer 204.

In a preferred embodiment, controller 300 may include a single microprocessor or multiple microprocessors 302 for controlling the operations or functions of system 304 and/or machine 100. Numerous commercially available microprocessors may be configured to perform the functions of controller 300. Further, microprocessors 302 may be general-purpose microprocessors, or specially-constructed for a specific purpose. It should be appreciated that controller 300 could readily embody a general-purpose or specially-constructed computer capable of controlling numerous machine functions. Microprocessors 302 may store information related to the requested information, or any of the machine functions discussed above in hardware, software, firmware, or instructions.

Controller 300 may further include computer-readable medium or memory 306, secondary storage device 308, and any other components for running an application. Computer-readable memory 306 may be implemented with various forms of memory or storage devices, such as read-only memory (ROM) devices and random access memory (RAM) devices such as flash memory. Secondary storage device 308 may include memory tape, a disk drive, or an integrated circuit (IC) for storing and providing data as input to and output from controller 300. Memory 306 and secondary storage device 308 may store the information related to the requested information, or any of the machine functions discussed above. Further, memory 306 and secondary storage device 308 may store information related to actuation of the machine functions discussed above. In an exemplary embodiment, the information may be stored in hardware, software, or firmware within memory 306, secondary storage device 308, and/or microprocessor 302.

As shown in FIG. 3, controller 300 may communicate with operator interface devices 202 through communication links 310. Additionally, communication links 310 may be used by controller 300 to communicate with other system modules 312 within machine 100. It is noted that system modules 312 may control any one or more of the machine functions discussed above. It is further contemplated that controller 300 may require user authentication, such as password verification, in order to prevent unauthorized users from gaining access to system 304 and/or machine 100.

Preferably, communication may be facilitated by the use of network architecture. Network architecture may include, alone or in any suitable combination, a telephone-based network (such as a PBX or POTS), a local area network (LAN), a wide area network (WAN), a dedicated intranet, and/or the Internet. Further, the network architecture may include any suitable combination of wired and/or wireless components. For example, communication links 314 may include non-proprietary links and protocols, or proprietary links and protocols based on known industry standards, such as J1939, RS-232, RP1210, RS-422, RS-485, MODBUS, CAN, SAEJ1587, Bluetooth, the Internet, an intranet, 802.11b or g, or any other communication links and/or protocols known in the art.

In an exemplary embodiment, the information shown on display 202b may relate to the desired machine function indicated by the requested actuation signal. In particular, the requested information may assist the operator in determining how to properly operate the desired machine function. For example, the information may include audible and/or visual confirmation of receipt of the help signal and/or the request for information with the operator. The information may further include icons, images, text, or audio reflecting a current state or any state of machine 100, such as, whether a requested machine function is presently enabled, disabled, or unavailable. If enabled, the information may further include the name of the requested machine function, a description of what the requested machine function does, a present mode thereof, or other available modes of the requested machine function. Preferably, the requested information may include how to properly manipulate operator interface devices 202 while using the requested machine function.

In another exemplary embodiment, the requested information may embody videos or animation, such as a tutorials, demonstrating proper use of the requested machine function, or specific features thereof. Alternatively, the requested information may embody text or literature concerning the requested machine function. For example, the requested information may be provided as answers to "frequently asked questions" (FAQS) concerning operation of the requested machine function. The requested information may further include links to videos, animation, tutorials, or audio clips concerning a requested machine function.

In a further exemplary embodiment, the operator may be able to search the requested information and/or select specific keywords relating to requested machine functions. The keywords may be associated with definitions, descriptions, videos, animation, tutorials, audio clips, and/or links to the same. For example, the requested information may embody an interactive electronic instruction manual for machine 100, which may include a table of contents, an index, search fields, keywords, links to videos, animation, tutorials, audio clips, and/or text pertaining to requested machine functions, or any other information associated with machine 100.

It is further contemplated the requested information may be presented according to operator preferences. For example, the requested information may be provided in a language preferred by the operator. Accordingly, at least some of the possible aforementioned embodiments of the requested information may be provided in the preferred language. In addition to preferred language, other non-limiting examples of operator preferences may include a default format in which the requested information is presented (e.g. tutorial or text), a default volume at which the requested information is presented, or any other preference an operator may wish to set or change.

A particular operator input routine may invoke the help feature described above. Specifically, when the at least one help request device 202f receives an operator's request for information just prior to operator interface devices 202 receiving a request for actuation of a machine function (i.e. an operator presses help button 202g followed by button 202c), a corresponding help signal may be generated and communicated to controller 300. Subsequently, actuation of the corresponding requested machine function (i.e. "bucket control"), or all machine functions, may be prevented for a predetermined amount of time, while the requested information is provided to the operator. Preferably, machine functions may be disabled while the operator reviews the requested information. This may improve machine safety by preventing unwanted actuation of machine functions when only information is desired. Operator navigation through the requested information may be facilitated by way of operator interface devices 200. When the operator has completed reviewing the requested information, a requested machine function may be initiated by activation of an appropriate operator input device (i.e. button 202c).

Conversely, when the at least one help request device 202f receives an operator's request for information after operator interface devices 200 receive a request for actuation of a machine function (i.e. an operator first presses button 202d, and then presses help button 202g), a corresponding requested actuation signal may be communicated to controller 300 prior to a corresponding help signal being communicated to controller 300. In this case, actuation of the requested machine function may occur before any requested information may be provided by controller 300. Since requested information may only be provided to the operator after actuation of the requested machine function has been completed, controller 300 may alert the operator that the requested machine function is presently enabled, and that the requested information will be provided only after the requested machine function has been completed. In some configurations, controller 300 may recommend to the operator that the requested information should be provided after the machine function has been completed. The operator may override the recommendation and receive the requested information by activating the help request device 202f again (i.e. pressing help button 202g). Further, in some configurations, upon completion of the requested machine function, and after machine 100 comes to a complete stop, machine functions may be disabled while the operator reviews the requested information.

In a further exemplary embodiment, when only help request device 202f is activated (i.e. no machine function has been requested), a corresponding help signal may be communicated to controller 300. In this case, controller 300 may provide one or more menus enabling the operator to select or change one or more preferences with respect to how requested information is provided. Subsequently, when an operator activates at least one help request device 202f just prior to requesting actuation of a machine function by way of operator interface devices 202, the requested information may be provided according to the one or more operator-selected preferences discussed above.

One skilled in the art will realize that the apparatus and methods illustrated in this disclosure may be implemented in a variety of ways, in many different environments, and include multiple other types of machines, machine functions, operator preferences, operator interface devices, help request devices, displays, controllers, and requested information that all functionally interrelate with each other to accomplish the individual tasks described above.

INDUSTRIAL APPLICABILITY

The disclosed help request feature may be applicable to any machine having functions that may require time to learn or benefit from training to operate properly. In particular, by employing the help request device in the manner disclosed, operators may become accustomed to machine functions quickly and independently, decreasing training costs, improving mental workload, and increasing operator productivity. Several examples of utilizing the help request feature will now be provided.

In one exemplary embodiment, when help request device 202f receives a request for information from an operator followed by a forward movement of joystick 202a, rather than implement 102 moving downward toward a work surface as usual, help request device 202f may become illuminated (i.e. backlit) and controller 300 may cause an image or icon of a wheel loader bucket to appear on display 202b instead. Additionally, the phrase "Bucket Control" may appear on display 202b within a "Function" field. Further, a description, such as, "the joystick controls vertical movement and orientation of the bucket," may appear in a "Description" field on display 202b. The description may also explain that forward and backward movement of the joystick 202a may cause the bucket to move downward and upward, respectively. In an "Available" field, "Enabled" may appear. In a "Mode" field on display 202b, "on/auto/off" may appear, meaning that vertical movement of the bucket may be controlled by way of joystick 202a, automatically by controller 300, or shut off, respectively. In a "Current Mode" field, "on" may appear. In an "Other Information" field, information such as a customer service phone number may appear.

In another exemplary embodiment, when help request device 202f receives a request for information from an operator followed by a request for actuation of the "Ride Control" feature 202d, rather than initiating the feature, help request device 262f may be illuminated (i.e. backlit) and controller 300 may cause an image or icon of wheels riding over rough terrain to appear on display 202b instead. Additionally, the phrase "Ride Control" may appear on display 202b within a "Function" field. Further, a description such as, "smoothens ride through hydraulic control of implement," may appear in a "Description" field on display 202b. In an "Available" field, "No" may appear. In a "Modes" field on display 202b, "off/auto/on" may appear, meaning that that the ride control feature may be turned off, automatically turned on and off as needed, or continuously on, respectively. In a "Current Mode" field, "off," may appear. In an "Other Information" field, information such as a customer service phone number may appear.

In another exemplary embodiment, when only help request device 202f is activated (i.e. no machine function has been requested), help request device 202f may be illuminated (i.e. backlit), and controller 300 may cause an image or icon of a face with a mouth and "Language" to appear on display 202b. Additionally, the phrase "Spanish" may appear within a "Current Language" field on display 202b. In an "Available Languages" field, a plurality of languages may be displayed. Additionally, controller 300 may cause "text/video" to appear within a "Available Display Modes" field, meaning that the requested information may be provided in either text or video format. In a "Current Display Mode" field, "text" may appear. In an "Audio Mode" field, "on/off" may appear. In a "Current Audio Mode" field, "on" may appear. In a "Volume" field "soft/medium/loud" may appear. In a "Current Volume" field, "medium" may appear. The operator may be able to select and/or change the current language, display mode, audio mode, and/or the volume by way of operator interface devices 200. Subsequently, at least some of the requested information may be provided according to these selected preferences.

In another exemplary embodiment, when an operator activates help request device 202f while machine 100 is in motion or performing another machine function (i.e. digging), controller 300 may instruct the operator to bring machine 100 to a complete stop before the requested information may be provided. Upon reaching a complete stop, machine functions may be disabled before the requested information is provided to the operator. In another configuration, controller 300 may make a recommendation to the operator that the requested information should be provided only after the requested machine function (i.e. digging) has been completed and/or machine 100 has come to a complete stop. The operator may override the recommendation and receive the requested information by, for example, activating help request device 202f again (i.e. pressing help button 202g).

It will be apparent to those skilled in the art that various modifications and variations may be made to the disclosed operator interface devices 202, help request device 202f, display 202b, or any other features of system 304. Other embodiments will be apparent to those skilled in the art from consideration of the specification and practice of the disclosed operator interface. It is intended that the specification and examples be considered as exemplary only, with a true scope being indicated by the following claims and their equivalents.

What is claimed is:

1. An operator interface for a machine, comprising:
a display device;
an operator interface device for receiving input from an operator corresponding to a requested machine function and for generating a machine function signal in response to the received operator input;
a help request device configured to receive a request from the operator for information and to generate a help signal in response to the request; and
a controller in communication with the display device, the operator interface device, and the help request device, the controller being configured to display on the display device information about the requested machine function to the operator in response to receiving the help signal and the machine function signal, the displayed information including:
a name or description of the requested machine function;
an indication of whether the requested machine function is currently enabled on the machine;
an indication of a current mode of operation for the requested machine function; and
a link to content regarding the requested machine function.

2. The operator interface of claim 1, wherein the operator interface device includes a plurality of buttons, each button corresponding to a different requested machine function, wherein the controller is further configured to provide information relating to each of the requested machine functions.

3. The operator interface of claim 1, wherein the controller is further configured to only provide the information to the operator when receipt of the help signal is followed by receipt of the machine function signal.

4. The operator interface of claim 1, further including a speaker in communication with the controller, wherein the controller is further configured to provide at least some of the information audibly via the speaker.

5. The operator interface of claim 1, wherein the controller is further configured to prevent actuation of the requested machine function in response to receiving the help signal.

6. The operator interface of claim 5, wherein the actuation is prevented for a period of time after receipt of the help signal.

7. The operator interface of claim 1, wherein the controller is configured to confirm receipt of the help signal to the operator.

8. The operator interface of claim 7, wherein the confirmation is audible.

9. The operator interface of claim 7, wherein the confirmation is visual.

10. The operator interface of claim 1, wherein the controller is further configured to receive a selection by the operator of a language in which the information about the requested machine function is provided.

11. The operator interface of claim 1, wherein, if the requested machine function is being performed when the help signal is received, the controller is further configured to provide the information about the requested machine function only after the requested machine function has been completed.

12. The operator interface of claim 1, wherein the controller is further configured to determine if the request for information is received during machine travel, and to provide the requested information only after machine travel has stopped.

13. The operator interface of claim 1, wherein the controller is further configured to:
determine whether a machine function is currently being performed; and
if it is determined that a machine function is currently being performed, recommend to the operator that the information about the requested machine function be provided only after performance of the machine function has been completed.

14. An operator interface for a machine, comprising:
an operator interface device including:
- at least one machine function device for receiving a request from an operator to actuate a machine function for at least one of a power source of the machine, a traction device of the machine, and a work implement of the machine, and for generating an actuation request signal in response to the received request to actuate the machine function; and
- a help request device configured to receive an operator's request for information and to generate a help signal in response to the request for information;

a display device; and
a controller in communication with the operator interface device, and the display device, the controller being configured to display, via the display device, information about the requested machine function, the displayed information including:
- a name of the requested machine function;
- a description of the requested machine function;
- an indication of whether the requested machine function is currently enabled on the machine;
- an indication of a current mode of operation for the requested machine function; and
- a link to content regarding the requested machine function.

15. A method of providing information relating to operation of a machine, comprising:
receiving a request for information;
receiving a request for actuation of a machine function;
determining, in response to the request for information and the request for actuation, whether the machine is at a complete stop;
if it is determined that the machine is not a complete stop, visually or audibly indicating to an operator of a machine that information about the requested machine function can only be provided when the machine is at a complete stop; and
displaying, on a display device associated with the machine, information about the requested machine function to the operator of the machine only when it is determined that the machine is at a complete stop, the displayed information including:
- a name of the requested machine function;
- a description of the requested machine function;
- an indication of whether the requested machine function is currently enabled on the machine;
- an indication of a current mode of operation for the requested machine function; and
- a link to access content regarding the requested machine function.

16. The method of claim 15, wherein the information is displayed only when the request for information is followed by the request for actuation.

17. The method of claim 16, further including:
preventing actuation of the requested machine function when the request for actuation is proceeded by the request for information; and
displaying the information about the requested machine function only after completion of a machine function currently being performed.

18. The method of claim 15, further including visually or audibly confirming the request for information.

19. The method of claim 15, wherein the information is displayed to the operator in a language selected by the operator.

* * * * *